R. MACKIE.
SPRAYING DEVICE.
APPLICATION FILED MAY 13, 1912.
1,098,160. Patented May 26, 1914.
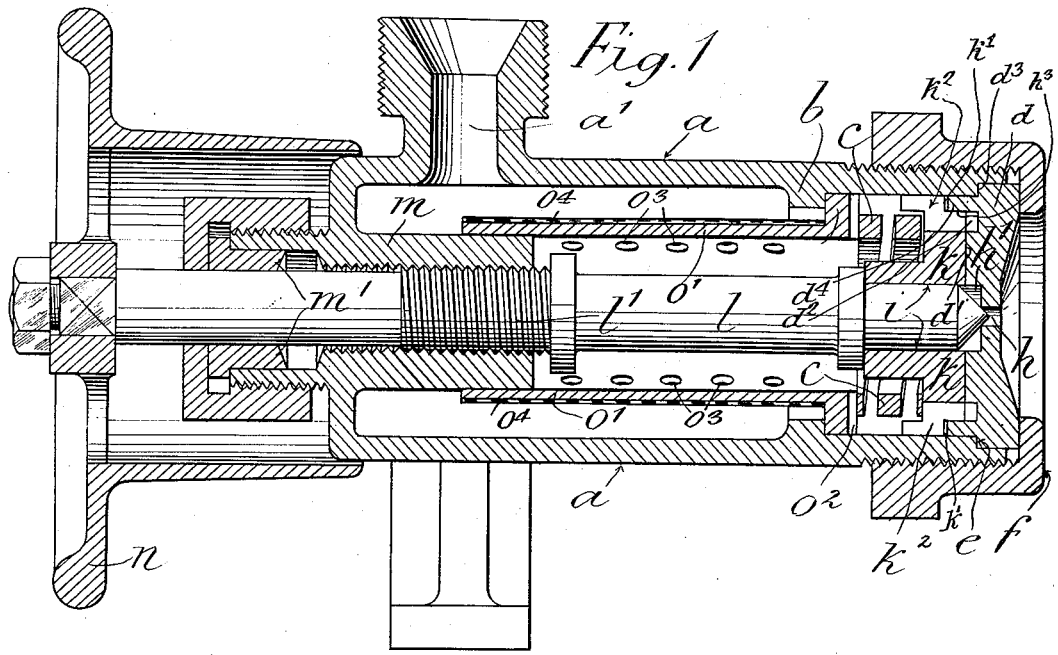
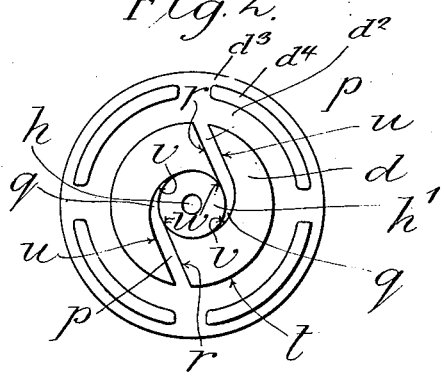
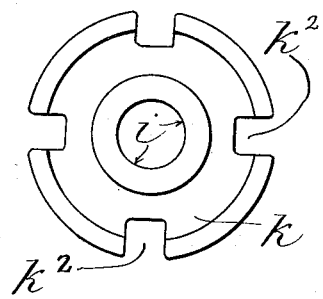

UNITED STATES PATENT OFFICE.

ROBERT MACKIE, OF WOOLSTON, ENGLAND, ASSIGNOR TO JOHN I. THORNYCROFT & CO. LIMITED, OF WOOLSTON, ENGLAND.

SPRAYING DEVICE.

1,098,160. Specification of Letters Patent. Patented May 26, 1914.

Application filed May 13, 1912. Serial No. 696,915.

*To all whom it may concern:*

Be it known that I, ROBERT MACKIE, a subject of the King of Great Britain and Ireland, residing at Woolston, in the county of Hants, England, have invented Improvements in or Relating to Spraying Devices, of which the following is a specification.

This invention relates to spraying devices, more particularly for use in burning liquid fuel, wherein the liquid is caused to enter a whirl chamber by guide channels or passages formed between say two disk elements that are supported in a stationary manner with respect to a control plug and maintained in contact with each other by the aid of a spring.

The object of the present invention is to improve the action of such spraying devices by providing disk elements having a special arrangement of channels for imparting a whirling motion to the liquid.

In the accompanying drawings, Figure 1 is a longitudinal section of a liquid-fuel burner according to the invention. Fig. 2 is a face view of one of the improved disks of the same. Fig. 3 is a rear view of the other disk of a pair.

$a$ is a cylindrical casing or body having an open forward end and at a short distance to the rear thereof an inwardly extending flange or shoulder $b$ that serves as an abutment for the flange $o$ of a strainer frame $o^1$, a short helical spring $c$ reacting between the said flange and a disk $k$, which keeps it in position. The frame $o^1$ is perforated at $o^3$ and surrounded by a gauze strainer $o^4$. The flange $o$ also has one or more grooves $o^2$ to allow passage of oil past the spring. The forward disk $d$ is fitted into a recess $e$ in the end of the casing or body and secured in position by a screw cap $f$ to insure an oil tight joint. Its rear face $d^1$ is formed so as to leave an annular space $d^2$, a shoulder $d^3$ and projecting lugs $d^4$; it is also recessed around the discharge aperture $h$ therein to produce a whirl chamber $h^1$ corresponding with the cylindrical passage $i$ in the rear spring pressed disk $k$. The disk $k$ (see Fig. 3) is formed with notches $k^2$ and has a peripheral recess $k^1$ in its face to be engaged by the lugs $d^4$ of the disk $d$ so that the two disks are properly centered one in relation to the other. The controlling plug $l$, which may have a concavo-conoidal or conical shaped forward end, is screw-threaded at $l^1$ where it works in a screw-threaded inwardly projecting boss $m$ on the end of the casing, escape of oil being prevented by a stuffing box packing and gland, at $m^1$; the external end of the plug having the usual hand wheel $n$.

The channels or passages according to the present invention are preferably formed in the rear face $d^1$ of the forward disk $d$. As shown in Fig. 2, the disk $d$ is formed with two channels $p$. One wall of each channel is straight throughout and tangential to the wall of the chamber $h^1$ while the other wall $u$ of each passage is straight for a part of its length and parallel to the wall $r$ but is curved at its inner end and terminates tangentially to the wall of the chamber $h^1$. The said channels $p$ are rectangular in cross section. The edges at the junctions $w$ between the inner surface of the chamber $h^1$ and the lateral sides or edges $r$ are truly square, that is to say straight and parallel to the axis of the disk.

Oil under pressure enters the casing through a branch $a^1$, passes through the notches $k^2$, through the channels $p$ to the chamber $h^1$ and when the plug $l$ is drawn back, escapes with a whirling motion, which causes the oil to be effectually sprayed.

Although two grooves or channels $p$ are illustrated in the example shown, it is to be understood that a single channel, or more than two channels, might be employed, the channels in the latter case being preferably equally spaced apart.

What I claim is:—

1. In a liquid sprayer of the kind referred to, a casing having a recess at the forward end and an internally screw-threaded boss at the rear, a screw threaded plug member passing through such boss, a disk, having a whirl chamber and discharge orifice, shouldered so as to be received by the recess at the forward end of the casing, a screw cap adapted to secure such disk to the casing and a disk having an aperture guiding the movement of the plug toward and from the discharge opening in the companion disk, the rear face of the first named disk being formed with an annular space concentric with the whirl chamber, and with rearwardly projecting lugs while the plug-guiding disk has a recess to receive the lugs upon the rear of the companion disk and is notched at intervals in the periphery to conduct liquid from the casing to the annular recess in the companion disk, the co-acting lugs and recess of the respective disks being an accurate fit to enable concentricity between the whirl chamber and the plug to be maintained independently of the casing.

2. In a liquid sprayer of the kind referred to, a casing having a recess at the forward end and an internally screw-threaded boss at the rear, a screw threaded plug member passing through such boss, a disk, having a whirl chamber and discharge orifice, shouldered so as to be received by the recess at the forward end of the casing, a screw cap adapted to secure such disk to the casing and a disk having an aperture guiding the movement of the plug toward and from the discharge opening in the companion disk, the rear face of the first named disk being formed with an annular space concentric with the whirl chamber, rearwardly projecting lugs and channels extending from the annular space tangentially to the said whirl chamber, while the plug-guiding disk has a recess to receive the lugs from the rear of the companion disk and is notched at intervals in the periphery to conduct liquid from the casing to the annular recess in the companion disk, the coacting lugs and recess of the respective disks being an accurate fit to enable concentricity between the whirl chamber and the plug to be maintained independently of the casing.

3. In a liquid sprayer of the kind referred to, a disk having a whirl chamber and a channel leading from the whirl chamber to the periphery thereof, one wall of the channel being straight throughout and tangential to the wall of the whirl chamber while the other wall is straight for a part of its length and parallel to the companion wall but is curved at its inner end and terminates tangentially to the wall of the whirl chamber.

4. In a liquid sprayer of the kind referred to, a disk having a whirl chamber, a concentric annular recess surrounding such chamber and a channel of rectangular cross section leading from the whirl chamber to such annular recess the depth of the said channel measured axially of the disk approximating to that of the whirl chamber and one wall of the channel being straight throughout and tangential to the wall of the whirl chamber while the other wall is straight for a part of its length and parallel to the companion wall but is curved at its inner end and terminates tangentially to the wall of the whirl chamber.

Signed at the American consulate, Southampton, England, this twenty-sixth day of April, 1912.

ROBERT MACKIE.

Witnesses:
HARVEY J. BAVERSTOCK,
CHARLES PACK.